(12) United States Patent  (10) Patent No.: US 7,317,674 B2
Rees et al.  (45) Date of Patent: Jan. 8, 2008

(54) OPTICAL PICK-UP UNITS AND LASER DRIVERS WITH INCREASED FUNCTIONALITY

(75) Inventors: Theodore D. Rees, Mountain View, CA (US); Alexander Fairgrieve, Menlo Park, CA (US); Bill R. Tang, San Jose, CA (US); Barry Harvey, Los Altos, CA (US); Yang Zhao, Fremont, CA (US)

(73) Assignee: Intersil Americas Inc., Milpitas, CA (US)

( * ) Notice: Subject to any disclaimer, the term of this patent is extended or adjusted under 35 U.S.C. 154(b) by 544 days.

(21) Appl. No.: 10/797,261

(22) Filed: Mar. 10, 2004

(65) Prior Publication Data

US 2004/0202072 A1   Oct. 14, 2004

Related U.S. Application Data

(60) Provisional application No. 60/453,528, filed on Mar. 11, 2003, provisional application No. 60/454,211, filed on Mar. 12, 2003.

(51) Int. Cl.
 G11B 7/12  (2006.01)
(52) U.S. Cl. ............... 369/53.27; 369/121; 369/47.5; 369/116; 369/47.52; 369/47.55; 369/47.53; 369/59.12; 369/59.11
(58) Field of Classification Search .............. 369/121, 369/53.27
See application file for complete search history.

(56) References Cited

U.S. PATENT DOCUMENTS

| 5,136,152 | A |   | 8/1992 | Lee |
| 5,216,659 | A | * | 6/1993 | Call et al. ................... 369/116 |
| 5,309,424 | A | * | 5/1994 | Ogawa ..................... 369/47.51 |
| 5,418,770 | A | * | 5/1995 | Ide et al. ................... 369/116 |

(Continued)

FOREIGN PATENT DOCUMENTS

EP       1 067529 A2    1/2001

(Continued)

OTHER PUBLICATIONS

English Translation of Office Action and Search Report for Chinese Patent Application No. 200480006679.X (issued Dec. 29, 2006).

(Continued)

*Primary Examiner*—Wayne Young
*Assistant Examiner*—Thomas Alunkal
(74) *Attorney, Agent, or Firm*—Fliesler Meyer LLP

(57) ABSTRACT

Optical pick-up units and laser drivers are disclosed, which can be used in various types of information recording/reproducing apparatuses, such as, but not limited to, DVD and CD drives, DVD camcorders, and DVD video recorders. A laser driver integrated circuit (LDIC) includes an automatic power controller, a running optical power controller, and a write strategy generator. The LDIC can be part of a chip-set, to be located on an optical pick-up unit (OPU). The chip-set can also include a power monitor integrated circuit (PMIC) to monitor the laser diode, and a photo-detector integrated circuit (PDIC) to detect light produced by the laser diode. The PMIC and the PDIC each include their own offset, gain and sample-and-hold circuitry.

11 Claims, 2 Drawing Sheets

U.S. PATENT DOCUMENTS

| | | | |
|---|---|---|---|
| 5,438,582 A * | 8/1995 | Hoshino et al. | 372/29.014 |
| 5,463,600 A * | 10/1995 | Kirino et al. | 369/13.24 |
| 5,495,463 A * | 2/1996 | Akagi et al. | 369/116 |
| 5,579,294 A * | 11/1996 | Ohta et al. | 369/47.31 |
| 5,680,384 A * | 10/1997 | Seki et al. | 369/112.29 |
| 5,719,835 A * | 2/1998 | Ishika | 369/44.26 |
| 5,745,451 A * | 4/1998 | Mukawa et al. | 369/44.29 |
| 5,777,964 A * | 7/1998 | Furuta et al. | 369/47.53 |
| 5,790,491 A * | 8/1998 | Jaquette et al. | 369/47.53 |
| 5,974,021 A * | 10/1999 | Toda et al. | 369/116 |
| 6,154,433 A * | 11/2000 | Hoshino et al. | 369/112.04 |
| 6,269,059 B1 * | 7/2001 | Kuroda et al. | 369/47.28 |
| 6,359,847 B1 * | 3/2002 | Shimizu | 369/53.26 |
| 6,414,932 B1 * | 7/2002 | Kaku et al. | 369/116 |
| 6,442,115 B1 * | 8/2002 | Shimoda et al. | 369/47.28 |
| 6,442,118 B1 * | 8/2002 | Hoshino et al. | 369/47.3 |
| 6,483,791 B1 * | 11/2002 | Asada et al. | 369/59.11 |
| 6,487,154 B1 * | 11/2002 | Kurebayashi et al. | 369/53.26 |
| 6,552,987 B1 | 4/2003 | Asada et al. | |
| 6,558,987 B2 * | 5/2003 | Lee | 438/149 |
| 6,636,472 B2 * | 10/2003 | Kurebayashi et al. | 369/116 |
| 6,654,328 B2 * | 11/2003 | Kaku et al. | 369/53.26 |
| 6,674,702 B2 * | 1/2004 | Asada et al. | 369/47.52 |
| 6,687,208 B2 * | 2/2004 | Asada et al. | 369/59.11 |
| 2002/0114244 A1 * | 8/2002 | Kelly et al. | 369/53.37 |
| 2002/0126609 A1 * | 9/2002 | Kaku et al. | 369/53.26 |
| 2002/0186628 A1 * | 12/2002 | Hoshino et al. | 369/47.3 |
| 2003/0174606 A1 * | 9/2003 | Tsukihashi et al. | 369/47.24 |

FOREIGN PATENT DOCUMENTS

| | | |
|---|---|---|
| JP | 11-213426 | 6/1999 |
| WO | WO 02/29793 A2 | 4/2002 |

OTHER PUBLICATIONS

Sony CX News, vol. 30, "CXA2640ER, 3-Channel LD Driver for Optical Disc Drive, Preliminary," #PE02223-PS, 13 pp., Late 2002 or Early 2003.

Sony CX News, vol. 32, "CXA2680ER," #J02Y22, 19 pp., May 2003.

Sony CX News, vol. 32, "CXA2674EM/CXA2673EM, Optical Pickup Chipset with Photodetector PDIC for Blue-Violet Laser Diodes" 2 pp., May 2003.

Sony CX News, "CXA2610AN, Laser Driver," #E00145A17, 10 pp., No Date.

Mitsubishi, "M61880FP," 14 pp., No Date.

Mitsubishi (Digital ASSP), "M66510/FP Laser-Diode Driver," 10 pp., No Date.

Mitsubishi (Digital ASSP), "M66512/FP, Laser-Diode Driver," 10 pp., No Date.

Mitsubishi (Digital ASSP), "M66515FP, Laser-Diode Driver/Controller," 7 pp., No Date.

Mitsubishi (Digital ASSP), "M66516FP, Laser-Diode Driver/Controller," 10 pp., No Date.

* cited by examiner

OPTICAL PICK-UP UNITS AND LASER DRIVERS WITH INCREASED FUNCTIONALITY

PRIORITY CLAIM

This application claims priority under 35 U.S.C. 119(e) to U.S. Provisional Patent Application No. 60/453,528, filed Mar. 11, 2003, entitled "OPTICAL PICK-UP UNITS AND LASER DRIVERS WITH INCREASED FUNCTIONALITY," and to U.S. Provisional Patent Application No. 60/454,211, filed Mar. 12, 2003, entitled "OPTICAL PICK-UP UNITS AND LASER DRIVERS WITH INCREASED FUNCTIONALITY," each of which is incorporated herein by reference.

FIELD OF THE INVENTION

The present invention relates to optical pick-up units and laser drivers, which can be used in various types of information recording/reproducing apparatuses, such as, but not limited to, DVD and CD drives, DVD camcorders, and DVD video recorders.

BACKGROUND

Laser drivers are used to drive laser diodes within various types of information recording/reproducing apparatuses, such as DVD and CD drives, DVD camcorders, and DVD video recorders. Typically, a laser driver provides a current to a laser diode, causing the laser diode to output a light signal. The light signal is appropriately focused by an optical system (e.g., including lenses, prisms and splitters) before the light signal irradiates an optical media disk. The magnitude of the current provided by the laser driver (which controls the output power of the laser diode) may vary depending on whether the laser diode is being used to read data from or write data to the media. Further, the magnitude of the current may also depend on specific disc media, DVD or CD standards, and/or the speed at which data is being read or written.

Environmental variations (such as temperature variations) and aging of the laser diode may affect the characteristics (e.g., threshold current and slope efficiency) of the laser diode. Accordingly, there is a need to accurately control the power of a laser diode to compensate for changes in the laser diode's characteristics.

Conventionally, a laser driver is located on an optical pickup, which is connected to a main circuit board through a flex cable that allows for analog communications between the main circuit board and the laser driver. Typically, a chip that performs Automatic Power Control (APC) and Running Optical Power Control (ROPC) is located on the main circuit board. Accordingly, the chip including the APC and ROPC typically must send and receive serial signals over the flex cable in order to communicate with and control the laser driver. When such signals must travel the relatively long distance up and down the flex cable, these signals often pick up noise or distortion prior to reaching their destination. It would be beneficial to improve on the convention systems in order to overcome some, and preferably all, of the above mentioned disadvantages.

SUMMARY OF THE INVENTION

Embodiments of the present invention relate to laser drivers and other related circuitry and functions. In accordance with an embodiment of the present invention, a laser driver integrated circuit (LDIC), which drives one or more laser diodes, includes an automatic power controller (APC), a running optical power controller (ROPC), and a write strategy generator (WSG). The automatic power controller (APC) controls an output of the laser diode to compensate for changes in characteristics of the laser diode. The running optical power controller (ROPC) controls the output of the laser diode to compensate for variations in the optical media. The write strategy generator (WS generator) implements an appropriate write strategy. The LDIC is adapted to be located on an optical pick-up unit (OPU), which communicates via a flex cable with a main board. In accordance with an embodiment of the present invention, the APC and ROPC each include there own dedicated offset, gain and sample and hold circuitry, thereby reducing an amount of analog signals to be sent over a flex cable between the OPU and a main board.

The LDIC can be part of a chip-set, which is adapted to be located on an optical pick-up unit (OPU) that can communicate with components on a main board over a flex cable. In accordance with an embodiment of the present invention, the chip-set also includes a power monitor integrated circuit (PMIC) to monitor the laser diode, and a photo-detector integrated circuit (PDIC) to detect light produced by the laser diode after the light has been reflected from an optical media. In accordance with an embodiment of the present invention, the PMIC and the PDIC each include their own dedicated offset, gain and sample-and-hold circuitry.

Further embodiments, and the features, aspects, and advantages of the present invention will become more apparent from the detailed description set forth below, the drawings and the claims

DETAILED DESCRIPTION

Figure 1:
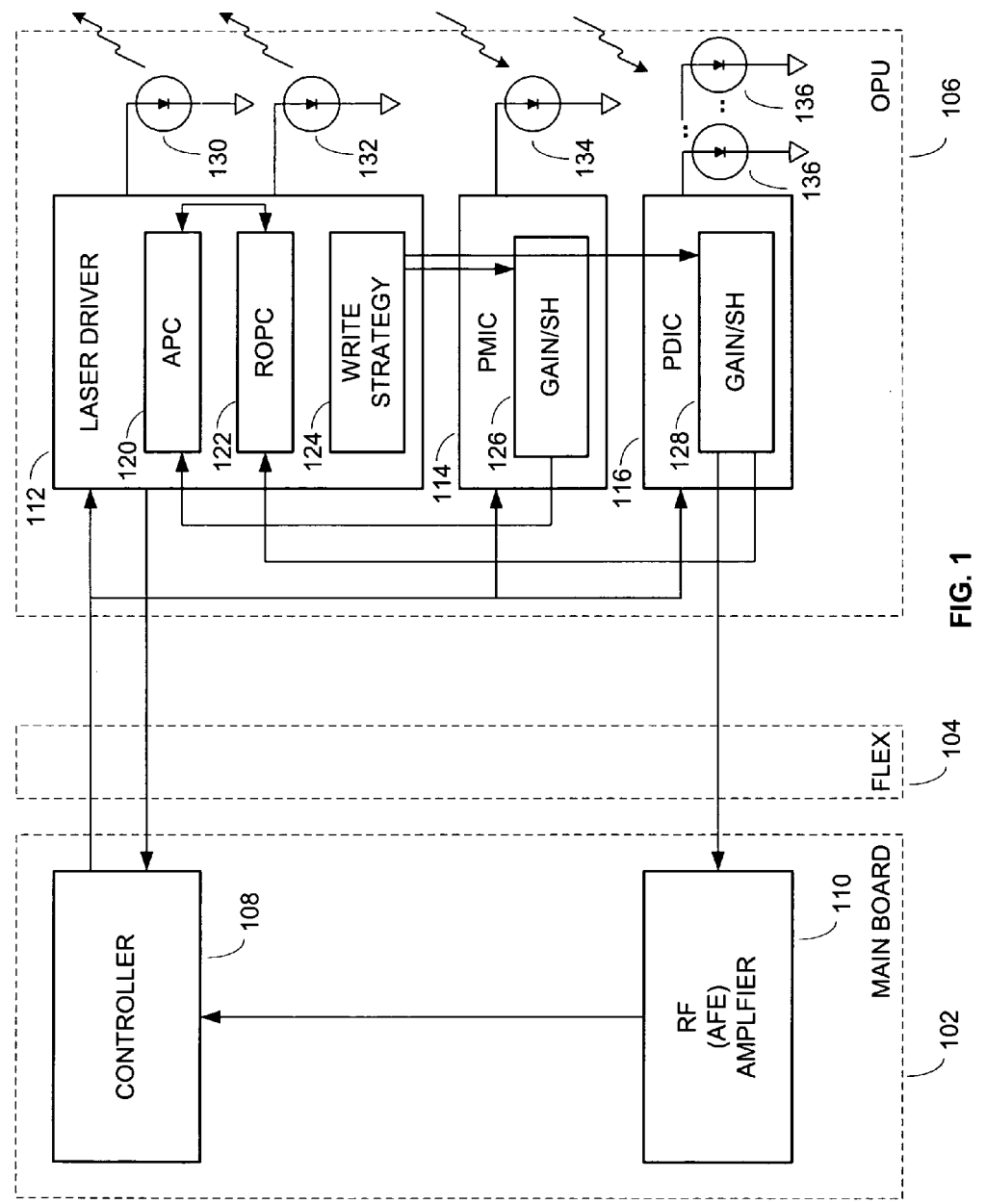
FIG. 1 shows portions of an information recording/reproducing apparatus, according to an embodiment of the present invention.

FIG. 1 shows portions of an information recording/reproducing apparatus, according to an embodiment of the present invention, including a main circuit board 102, a flex cable 104 and an optical pick-up unit (OPU) 106. The main board 102 includes a controller 108 and an analog front end (AFE) 110. The OPU 106 includes a laser driver integrated chip (LDIC) 112, a power monitor integrated chip (PMIC) 114 and a photo-detector integrated chip (PDIC) 116.

The LDIC 112 controls the current to laser diodes 130 and 132, causing one of the laser diodes 130 or 132 to output a light signal that, after being appropriately focused by an optical system (not shown), is incident on an a optical media disk (not shown). The magnitude of the current provided by the LDIC 112 (which controls the output power of the laser diode 130 or 132) can vary depending on whether the laser diode is being used to read data from or write data to the media. Further, the magnitude of the current may also depend on specific disc media, DVD or CD standards, and/or the speed at which data is being read or written.

Conventionally, power control is performed at the main board, requiring high bandwidth monitoring and information signals to be sent from an optical pick-up unit up the flex to the main board before power control processing can take place. While being sent up the flex, these signals are subject to corruption. In accordance with an embodiment of the present invention, the LDIC 112 includes an automatic power control (APC) portion 120, a running optical power control (ROPC) portion 122 and a write strategy generator 124. Thus, there is no need for high bandwidth signals to be sent over the flex 104 before power control processing can occur. Rather, as discussed in more detail below, the monitoring and information signals are produced and processed (at least for power control) on the OPU 106, thereby relaxing the requirements of communications over the flex 104.

The LDIC 112 is shown as being capable of driving two different laser diodes 130 and 132. For example, one of the laser diodes outputs a wavelength of about 780 nm, which used in CD technology, and the other laser diode outputs a wavelength of about 655 nm, which is used in DVD technology. Accordingly, LDIC 112 can be used in CD and/or DVD type devices. Of course, a single laser diode can be used, if the LDIC is only going to be used with one type of technology. Another exemplary wavelength output by one of laser diodes 130 and 132 is blue-violet light having a wavelength of about 405 nm, which is used with Blu-ray technology. The LDIC 112 can also be possible of driving more than two laser diodes. For example, the LDIC 112 can be capable of driving a first laser diode that outputs a wavelength of 780 nm, a second laser diode that outputs a wavelength of 655 nm, and a third laser diode that outputs a wavelength of 405 nm. Of course, the laser diodes can output light signals of other wavelengths.

The write strategy generator 124 implements an appropriate write strategy, which may depend, for example, on the media, DVD or CD standards, and/or speed being supported. The ROPC 122 uses (e.g., modulates) the APC signals to compensate for variations in the optical media. The APC 120 controls the laser diode to compensate for changes in the laser diode's characteristics. These portions are discussed in more detail below.

A photo-detector 134 detects optical signals output by laser diode 130 or 132 before the light signals reach the media, and provides a signal representative of the detected intensity to the PMIC 114. In contrast, multiple photo-detectors 136 detect the optical signal that has been reflected from the media (e.g., DVD or CD media). An information signal produced by photo-detectors 136 includes user data (e.g., to be provided to a host in response to a read request from the host), servo information (e.g., used for servo control) and amplitude information. Samples of the amplitude of the information signal produced by the PDIC 116 are provided to the ROPC 122, which adjusts the power signal and current signal in the APC to compensate for variations in the media, as discussed below. Samples of the signal produced by the photo-detector 134, in contrast, are used by the APC 120 to compensate for environmental variations and aging of the laser diodes 130 and 132.

Conventionally, the sample-and-hold and loop compensation circuitry associated with power monitoring and photo-detection are located on a main board, requiring analog signals to be sent up a flex cable before they are amplified and sampled on the main board. The flex cable typically distorts these analog signals prior to sampling. As shown in FIG. 1, in accordance with an embodiment of the present invention, the PMIC 114 and the PDIC 116, each include their own dedicated offset, gain and sample-and-hold (gain/SH) circuits 126 and 128. This enables the PMIC 114 to amplify and sample the analog monitoring signal produced by photo-detector 134. This also enables the PDIC 116 to amplify and sample the analog information signal produced by photo-detectors 136. Such amplification and sampling on the OPU 106 increases fidelity by enabling much finer and more controlled sampling. Additionally, power consumption is reduced because, after sampling, the signals (driven over the flex 104) are relatively slow (it takes less power to drive a slow signal than to drive a fast signal).

The samples of the information signal produced by the PDIC 116 are sent up the flex 104 to the AFE 110, which performs front end signal processing, such as converting analog data to digital data, and controlling focusing and tracking servo loops. The AFE 110 provides a digital signal to the controller 108, as shown in FIG. 1. The controller 108 may communicate (directly or through one or more interface circuits) with a host computer and a servo controller.

Conventional controllers that are located on a main board send current control signals to a laser driver located on an optical pickup. In accordance with an embodiment of the present invention, the controller 108 sends power control signals (rather than current control signals) up the flex 104 to the laser driver 112. This is possible, in part, due to the APC 120 and the ROPC 122 being located within the LDIC 112. When the LDIC 112 receives the power control signals, the APC and ROPC allow the LDIC 112 to determine for itself the required current to drive the laser diodes 130 or 132.

Conventionally, signals produced by an APC and an ROPC have to travel down a flex, where the signals are subject to corruption prior to signal processing. By moving the APC 120 and ROPC 122 into the LDIC 112 signal corruption is significantly reduced.

Environmental variations (such as temperature variations) and aging of the laser diodes 130 and 132 may affect the characteristics (e.g., slope efficiency) of the laser diodes 130 and 132. The APC 120 accurately controls the output of the laser diodes 130 and 132 to compensate for changes in the laser diode's characteristics. In accordance with an embodiment of the present invention, the APC 120 includes its own dedicated offset, gain, sample-and-hold and loop compensation circuitry (not shown).

The ROPC 122 monitors signals produced by the PDIC 116 in order to purposely modify the power of laser diodes 130 and/or 132 to compensate for changes/contamination in the media (e.g., due to fingerprints and the like). In other words, if the light going to the media reflects back differently than expected, the ROPC 122 adjusts the power to compensate for the changes in the media (rather than keeping the power constant). In accordance with an embodiment of the present invention, the ROPC 122 can accomplish this using its own offset, gain, sample-and-hold and loop compensation circuitry (not shown).

In accordance with an embodiment of the present invention, a write strategy generator (i.e., write strategy generator 124) is only located in the pickup head 106, without the need for a write strategy generator also being located on the main board 102. A write strategy generator has typically been needed on a main board, because sample-and-hold functions typically occurred on the main board. Embodiments of the present invention have migrated the sample-and-hold functions onto the pick-up head, as discussed above, eliminating the necessity for a write strategy generator on the main board 102.

Figure 2:
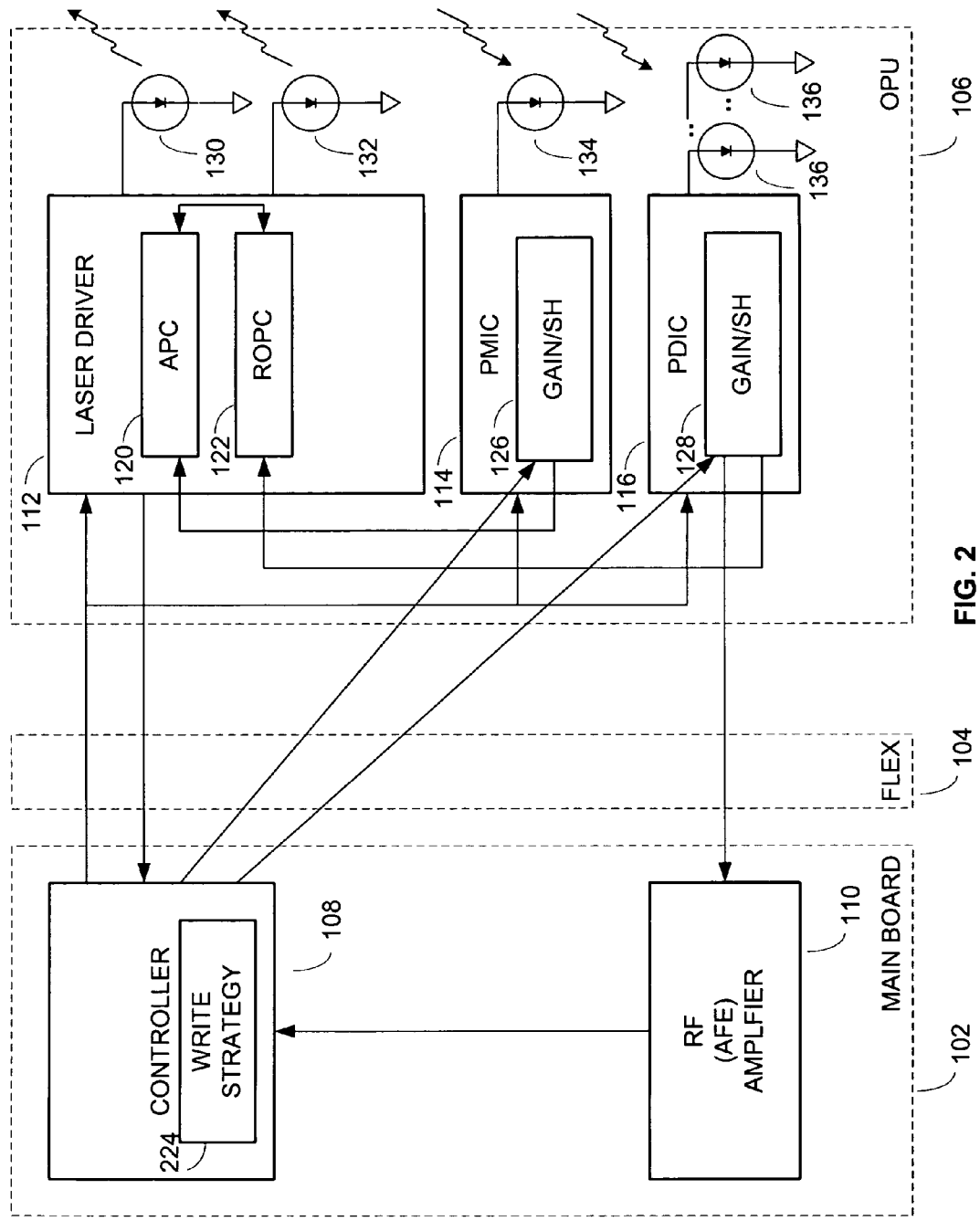
FIG. 2 shows portions of an information recording/reproducing apparatus, according to another embodiment of the present invention.

In the embodiment just described, both sample-and-hold circuits as well as write strategy generator circuits were all moved from the main board 102 to the OPU 106. While this is preferable, it is also possible to move the sample-and-hold circuits onto the pick-up head while still having a write strategy generator 224 within the controller 108 on the main board 102, as shown in FIG. 2. In such an embodiment, sample-and-hold timing signals would be send down the flex 104 from a write strategy generator 224 on the main board to the sample-and-hold circuits 126 and 128 of the PMIC 114 and PDIC 116.

Embodiments of the present invention can be used with various types of information recording/reproducing apparatuses. Exemplary apparatuses include, but are not limited to, DVD and CD drives, DVD camcorders, and DVD video recorders. Embodiments of the present invention can also be used for fiber optic applications or optocoupler applications where it is important to control the power of emitted light. These are just a few exemplary applications for embodiments of the present invention, and are not meant to be limiting.

The forgoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art. Embodiments were chosen and described in order to best describe the principles of the invention and its practical application, thereby enabling others skilled in the art to understand the invention. It is intended that the scope of the invention be defined by the following claims and their equivalents.

What is claimed:

1. A laser driver integrated circuit (LDIC), the LDIC including:
    an automatic power controller (APC);
    a running optical power controller (ROPC); and
    a write strategy generator (WSG);
    wherein said APC, said ROPC and said WSG are all included in the LDIC;
    wherein the LDIC is configured to be located on an optical pickup unit (OPU) and to drive a laser diode that is located on the OPU with the LDIC;
    wherein said APC is configured to control an output of the laser diode to compensate for changes in characteristics of the laser diode;
    wherein said ROPC is configured to control the output of the laser diode to compensate for variations in an optical media;
    wherein said WSG is configured to implement write strategies; and
    wherein said APC and said ROPC each include there own dedicated offset, gain and sample and hold circuitry, thereby reducing an amount of analog signals to be sent over a flex cable between the OPU and a main board.

2. The LDIC of claim 1, wherein said APC is adapted to receive power control signals over the flex cable that connects the OPU with a controller on the main board, and wherein the LDIC determines a current for which to drive the laser diode, based at least in part on the power control signal.

3. The LDIC of claim 2, wherein said APC and said ROPC are used by the LDIC to determine the current for which to drive the laser diode.

4. A chip-set, comprising:
    a laser driver integrated circuit (LDIC) adapted to drive a laser diode, said LDIC including an automatic power controller (APC) and a running optical power controller (ROPC); and
    a power monitor integrated circuit (PMIC) to monitor the laser diode, said PMIC including its own dedicated offset, gain and sample-and-hold circuitry; and
    a photo-detector integrated circuit (PDIC) to detect light produced by the laser diode after the light has been reflected from an optical media, said PDIC including its own dedicated offset, gain and sample-and-hold circuitry;
    wherein the chip-set is configured to be located on an optical pick-up unit (OPU) that can communicate with components on a main board over a flex cable.

5. The chip-set of claim 4, wherein said LDIC further comprises a write strategy generator (WSG) to implement write strategies.

6. The chip-set of claim 5, wherein said WSG implements write strategies by controlling said offset, gain and sample-and-hold circuitry of said PMIC and said PDIC, without requiring communications over the flex cable.

7. The chip-set of claim 4, wherein said offset, gain and sample-and-hold circuitry of said PMIC and said PDIC are controlled by a write strategy generator (WSG) located on the main board.

8. The chip-set of claim 4, wherein:
    said automatic power controller (APC) controls an output of the laser diode to compensate for changes in characteristics of the laser diode; and
    said running optical power controller (ROPC) controls the output of the laser diode to compensate for variations in an optical media.

9. The chip-set of claim 8, wherein said APC receives power control signals over the flex cable, and wherein said LDIC determines a current for which to drive the laser diode, based at least in part on the power control signal.

10. The chip-set of claim 9, wherein said APC and said ROPC are used by said LDIC to determine the current for which to drive the laser diode.

11. A laser driver integrated circuit (LDIC), the LDIC including:
    an automatic power controller (APC);
    a running optical power controller (ROPC); and
    wherein the APC and the ROPC are both included in the LDIC;
    wherein the LDIC is configured to drive a laser diode that is located on an optical pick-up unit (OPU) with the LDIC;
    wherein said APC is configured to control an output of the laser diode to compensate for changes in characteristics of the laser diode;
    wherein said ROPC is configured to control the output of the laser diode to compensate for variations in an optical media; and
    wherein said APC and said ROPC each include there own dedicated offset, gain and sample and hold circuitry, thereby reducing an amount of analog signals to be sent over a flex cable between the OPU and a main board.

* * * * *